United States Patent [19]

Ketchersid, III

[11] Patent Number: 5,606,474

[45] Date of Patent: Feb. 25, 1997

[54] HIGH DENSITY DISK DRIVE WITH ACCELERATED DISK ACCESS

[75] Inventor: John W. Ketchersid, III, Atlanta, Ga.

[73] Assignee: Latsu, Inc., Atlanta, Ga.

[21] Appl. No.: 373,761

[22] Filed: Jan. 17, 1995

[51] Int. Cl.$^6$ .......................... G11B 17/02; G11B 5/49; G11B 21/16
[52] U.S. Cl. ......................... 360/98.01; 360/104
[58] Field of Search .................. 360/97.01–97.04, 360/98.01, 104

[56] References Cited

U.S. PATENT DOCUMENTS

| | | | |
|---|---|---|---|
| 2,835,743 | 5/1958 | Muffley | 179/100.2 |
| 2,840,440 | 6/1958 | McLaughlin et al. | 346/74 |
| 2,941,189 | 6/1960 | McCreary | 340/174 |
| 3,090,947 | 5/1963 | Hoberg et al. | 340/174.1 |
| 3,135,949 | 6/1964 | Whyte | 340/174.1 |
| 3,155,977 | 11/1964 | Marrs | 346/74 |
| 3,226,701 | 12/1965 | Masson | 340/174.1 |
| 3,229,268 | 1/1966 | Solyst | 340/174.1 |
| 3,303,485 | 2/1967 | Lee | 340/174.1 |
| 3,320,599 | 5/1967 | Billawala | 340/174.1 |
| 3,405,405 | 10/1968 | Boissevain et al. | 34/174.1 |
| 3,537,083 | 10/1970 | Voth | 340/174.1 |
| 3,601,871 | 8/1971 | Pierce | 29/603 |
| 3,696,351 | 10/1972 | Groom et al. | 340/174.1 C |
| 4,158,213 | 6/1979 | Griffith | 360/121 |
| 4,406,722 | 9/1983 | Chow et al. | 156/89 |
| 4,422,115 | 12/1983 | Spash | 360/104 |
| 4,602,305 | 7/1986 | Ghose | 360/97 |
| 5,016,128 | 5/1991 | DiIorio et al. | 360/97.01 |
| 5,025,336 | 6/1991 | Morehouse et al. | 360/97.02 |
| 5,041,932 | 8/1991 | Hamilton | 360/104 |
| 5,089,923 | 2/1992 | Lehureau | 360/121 |
| 5,124,869 | 6/1992 | Lehureau | 360/121 |
| 5,237,476 | 8/1993 | Bischoff et al. | 360/126 |
| 5,264,975 | 11/1993 | Bajorek et al. | 360/97.01 |

*Primary Examiner*—Robert S. Tupper
*Attorney, Agent, or Firm*—Jones & Askew

[57] ABSTRACT

A high density fixed head disk drive is shown. Small track width and small inter-track spacing is accomplished by small head-to-media distances, which are maintained by fabricating both read/write heads and demultiplexer circuitry on a single planer substrate constituting a head mount disk. Spacing between the head mount disk and media disk is controlled by placing the head mount disk on the periphery of annular housings that are slightly thicker than the media disk and thus controlling the spacing there between. Close inter-track spacing is provided by angularly offsetting radial groups of read/write heads on the head mount disk. Construction of a head mount disk and media disk of the same material provides physical thermal tracking thus minimizing track misalignment problems due to temperature variations. Additionally, shorter duration writing pulses are employed on outer tracks to increase information density per unit area of the media disk.

In an alternate embodiment, head-to-media separation is eliminated by fabricating heads that extend to make contact with an opposing media disk. Contact is maintained with the media disk by angling the lash heads in the direction of media disk travel and flexing them against the same.

36 Claims, 6 Drawing Sheets

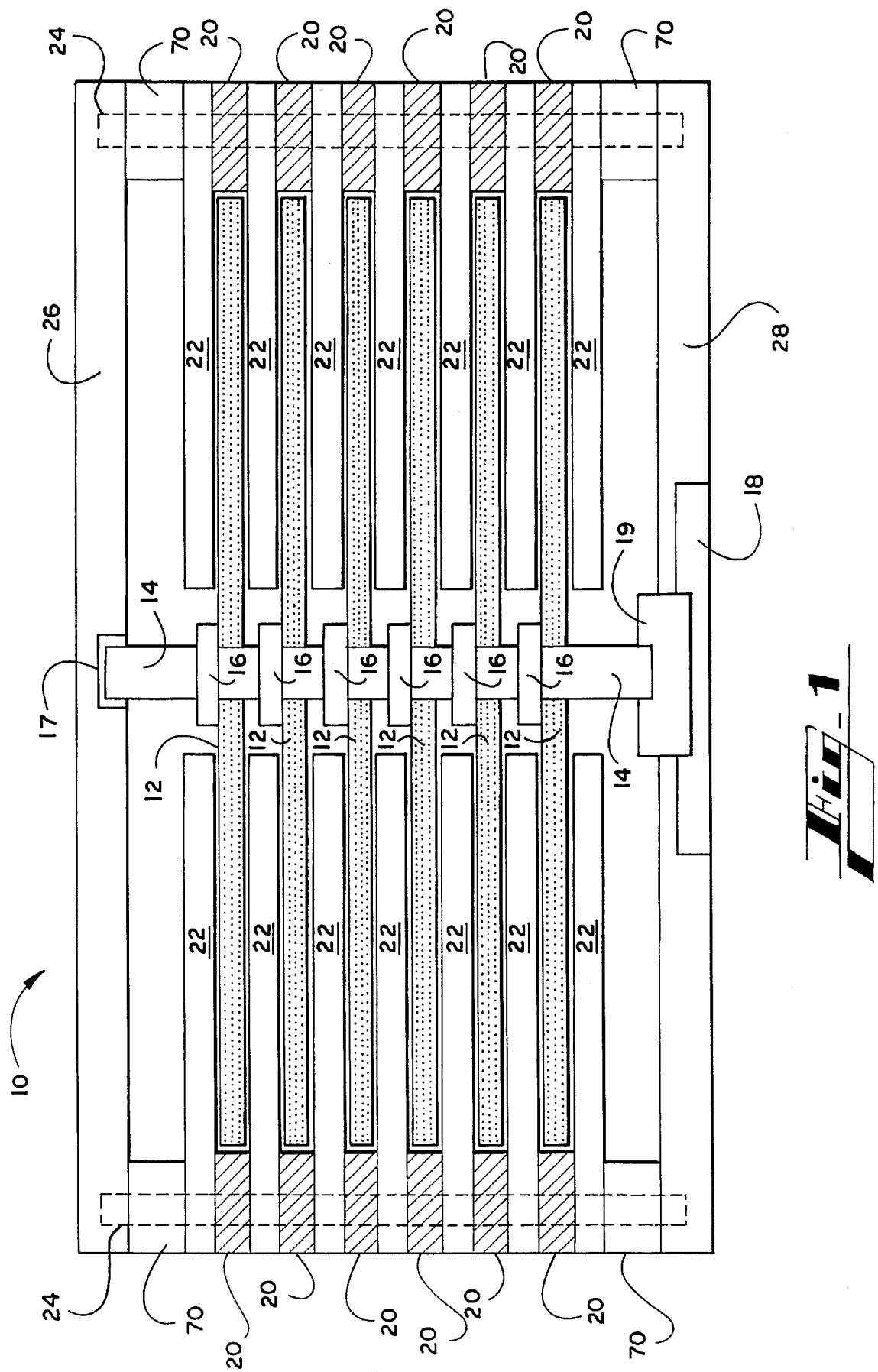

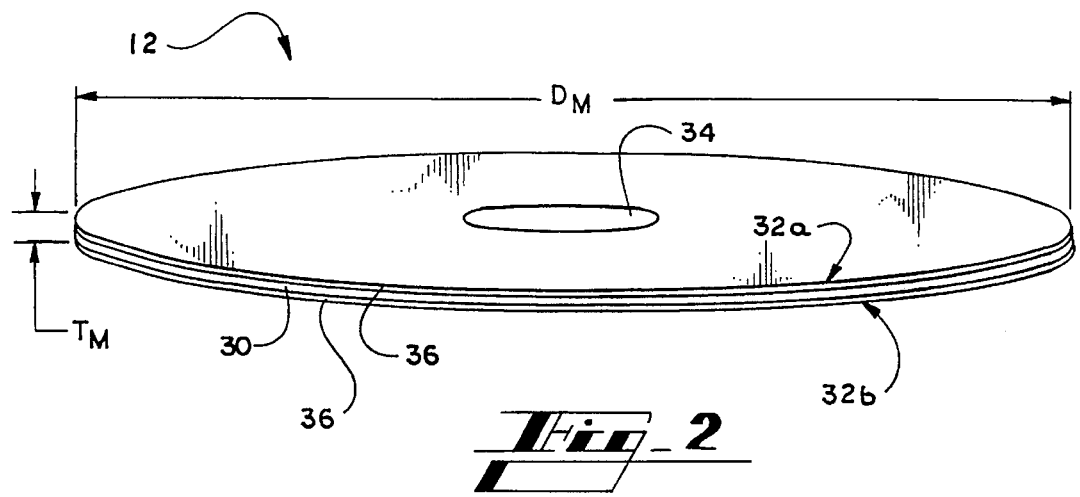
Fig_2
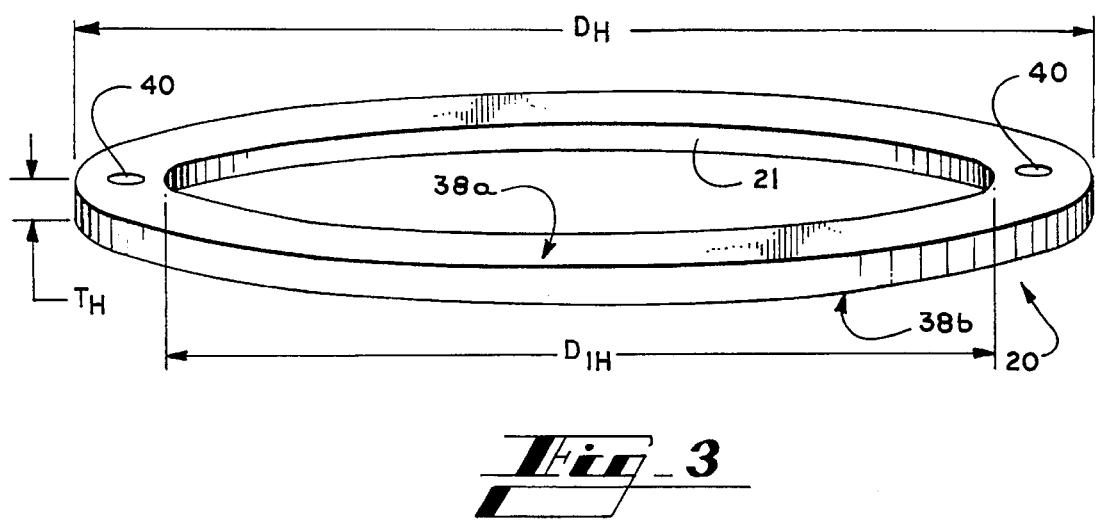
Fig_3
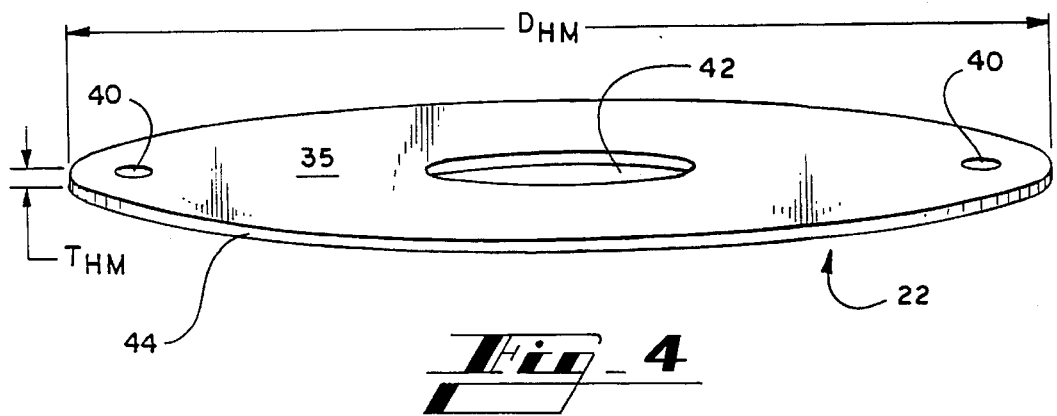
Fig_4

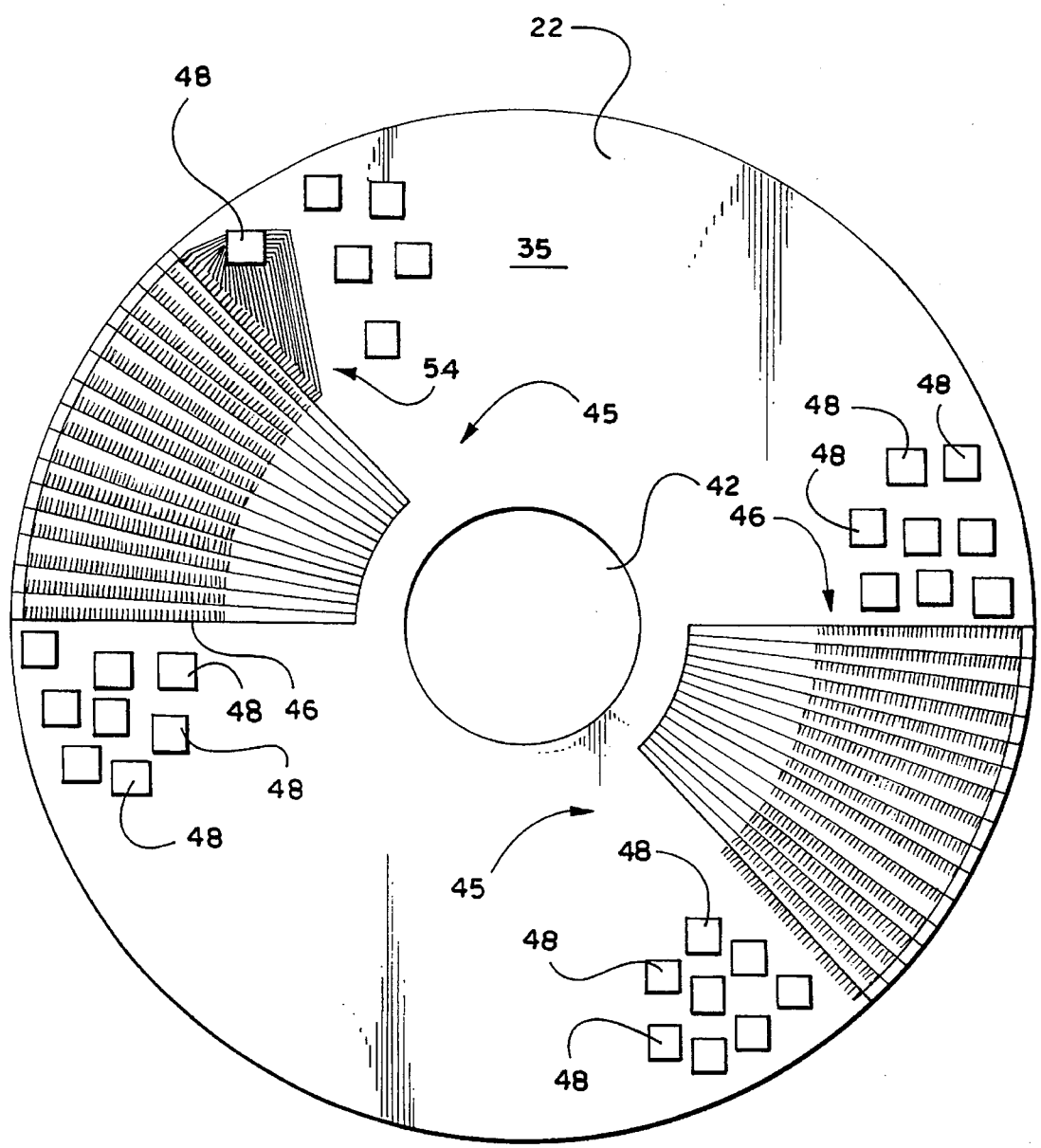
Fig_5

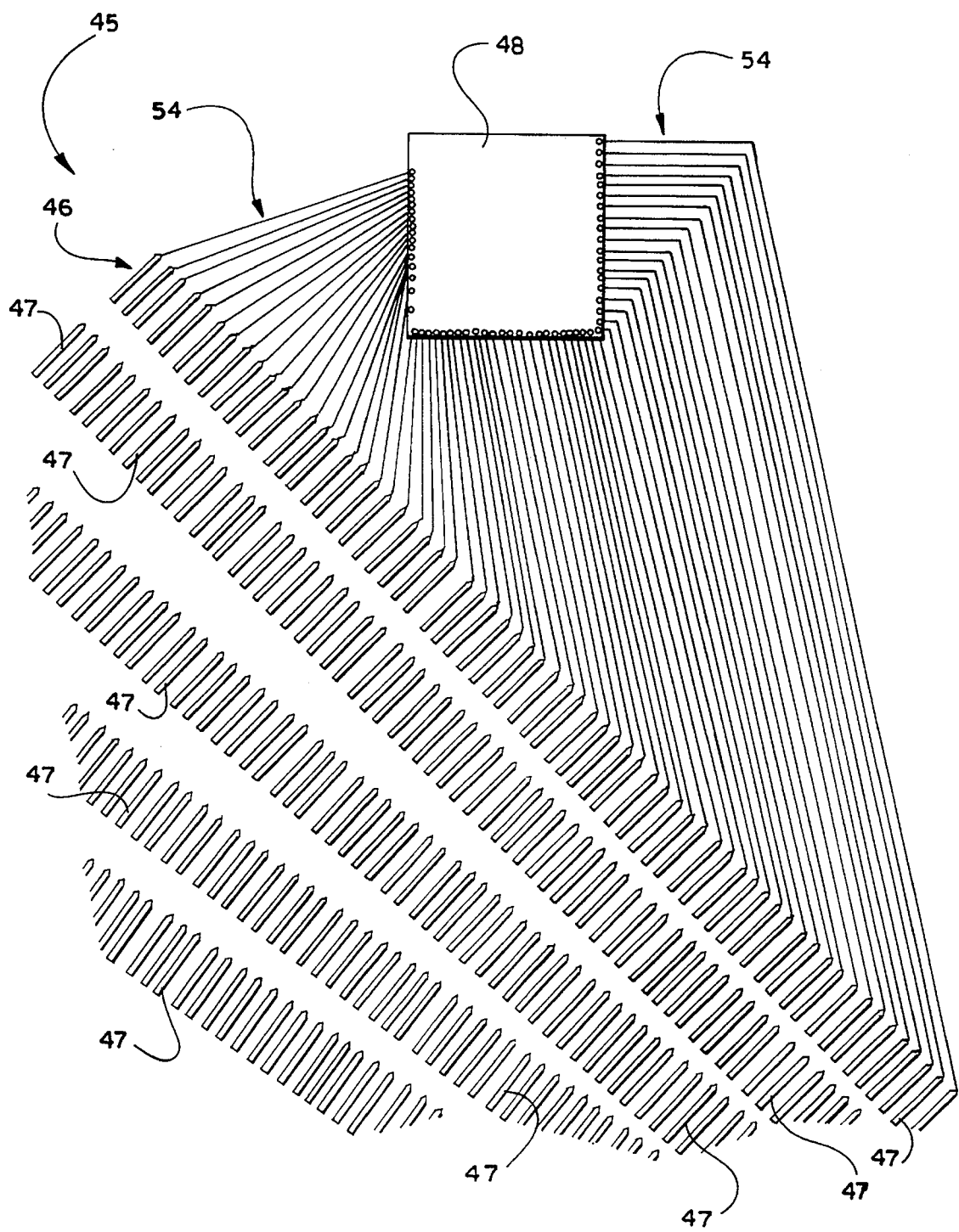
Fig_6

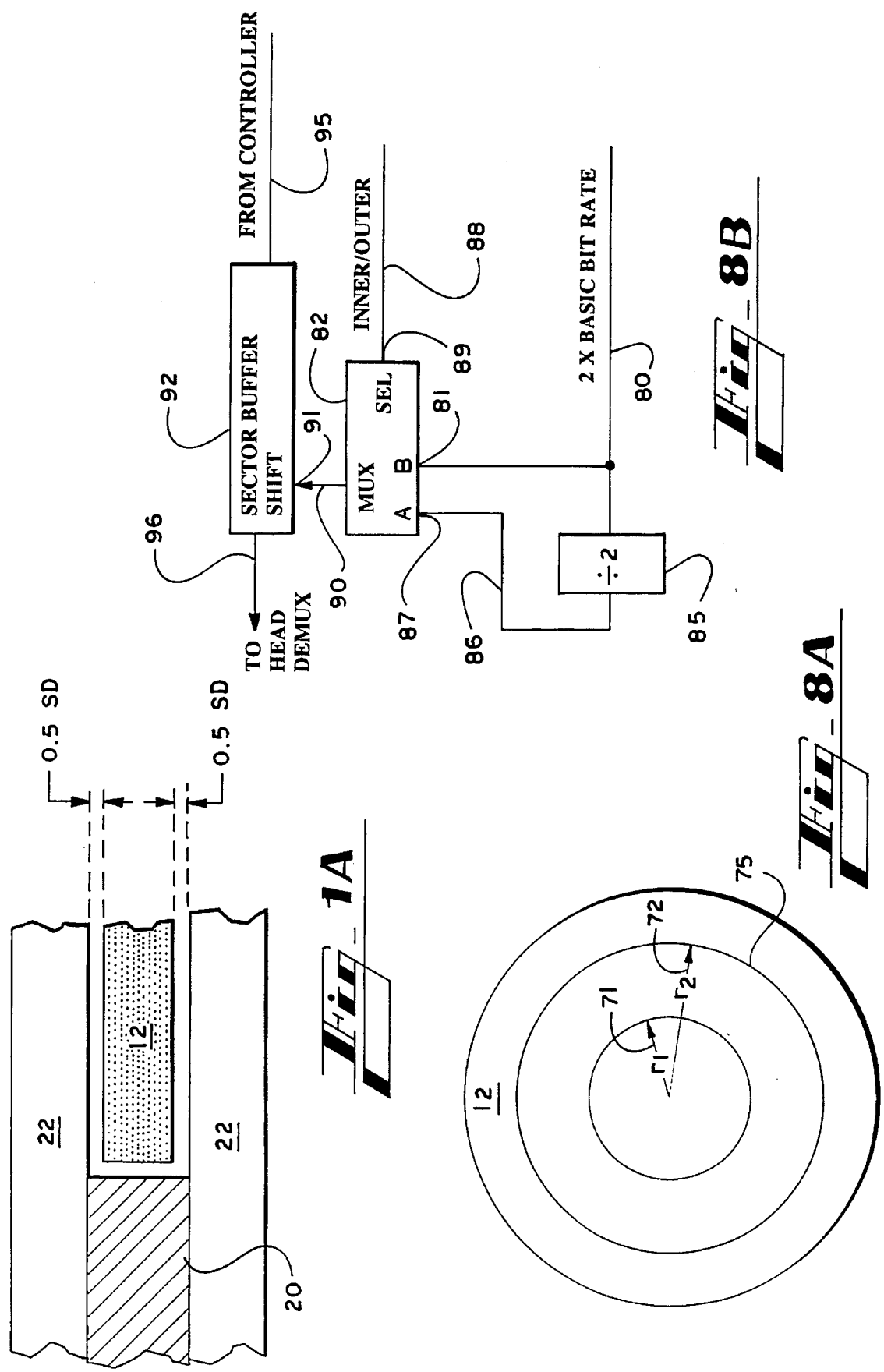

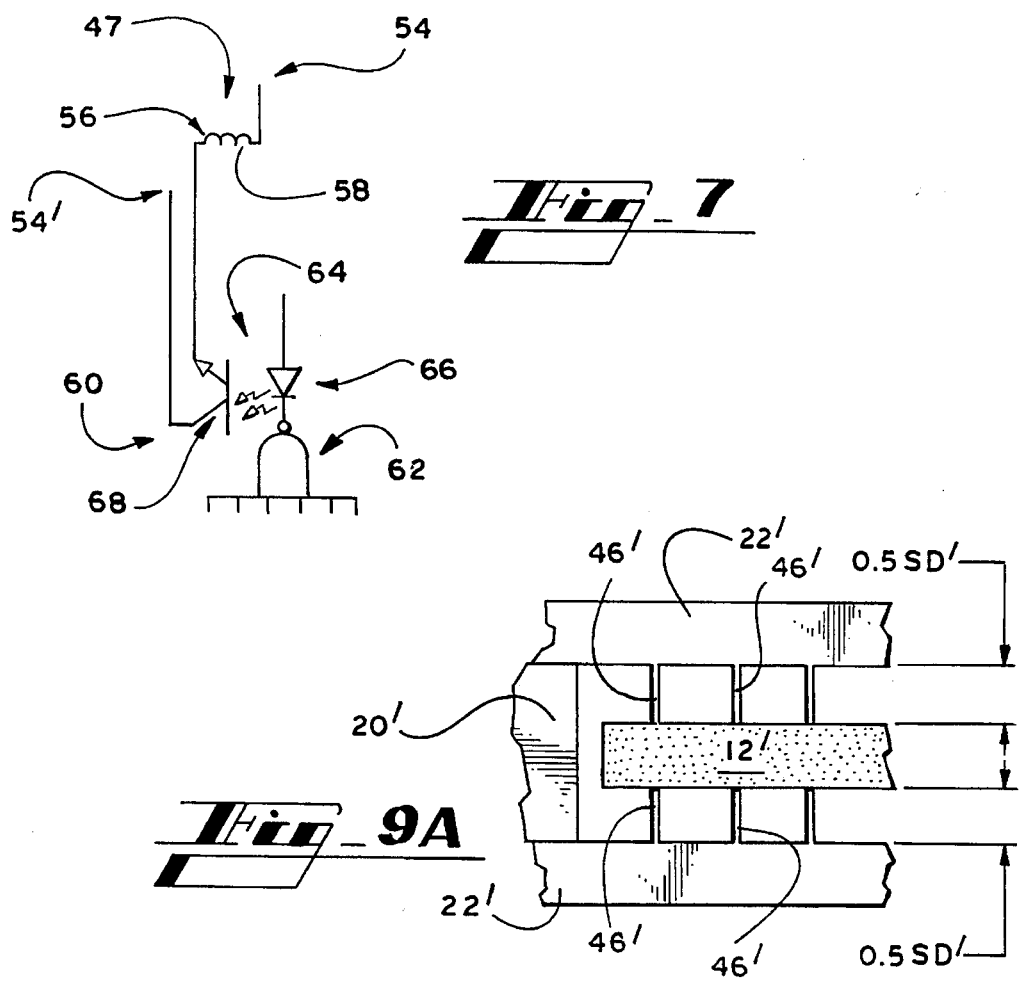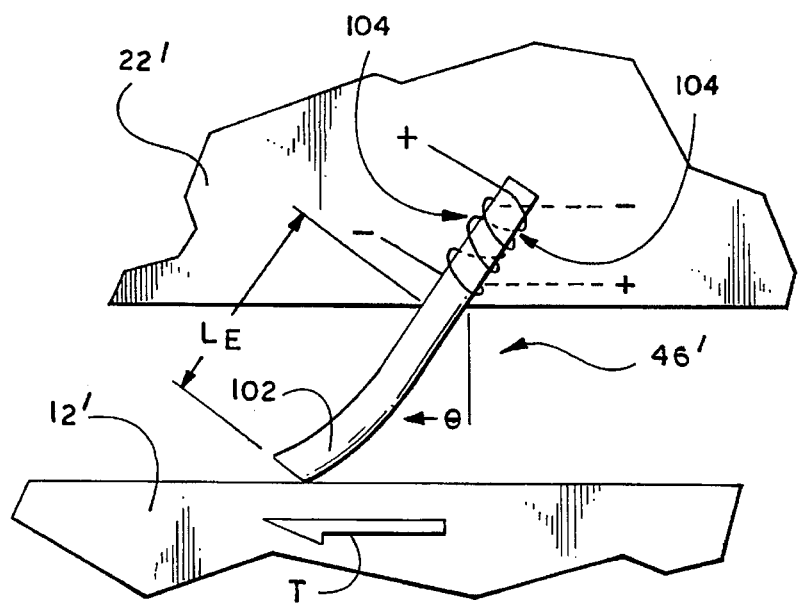

HIGH DENSITY DISK DRIVE WITH ACCELERATED DISK ACCESS

TECHNICAL FIELD

The present invention relates generally to information storage devices, and more particularly to a high density disk drive with accelerated disk access.

BACKGROUND OF THE INVENTION

From the late 1970s through the present day the use of digital computing devices has proliferated in businesses, homes, academia, and a multitude of other environments. This development has been due, in large part, to a continuing increase in the speed at which computers retrieve and process large amounts of information. Nevertheless, because the complexity of tasks performed by computers continues to increase, there remains a further need to accelerate the speeds at which computers operate.

Computers comprise three principal component types, which allow them to receive, store, manipulate and transmit data. These principal component types are peripheral, processor and memory. Peripheral devices transmit information into and out of a computer. Processors are the workhorses of a computing device, recalling and manipulating information as instructed by a controlling program. The memory devices store processed and inputted information as well as programming instructions for the processors.

These components act in concert with one another to carry-out the computing process. Because of this, the slowness of one component necessarily acts as a speed governor on the entire computing process. Memory is the slowest principal component, and thus the speed governor of the computing process. Thus, there exists a need in the art for memory devices of improved speed.

The most commonly used memory devices are two basic types, random access and disk drive. While random access type memory provides fast access times, it is expensive to maintain and volatile, loosing information when power is removed. As a result, random access memory is unsuitable for long term storage of the bulk of information use by a computer, which must be retained over long terms. Therefore, typical random access memory is normally used for storage of executable program instructions, buffers for holding data recently processed, awaiting processing, when generally expected to be used in the relatively near future, and buffers for input/output devices, including display memory. Because of this, disk drive memory, which is non-volatile and relatively inexpensive, is used for the long term storage of information.

While typical disk drives provide economical devices for storing relatively large amounts of information, access to that information tends to be slow as compared to the speeds at which a computer CPU can process information and information can be written to and from random access memory. Thus, the rate limiting step for many processes executed by general purpose digital computer is often the time required to retrieve data from a disk or write it to a disk.

In particular, a parameter of a disk drive is the access time. The access time is the time lag between the issuance of a call for reading data from a disk until the data is actually available at the port to which the disk is attached. The components of the access time are the seek time plus the maximum time to locate the first information of interest on a particular track. These parameters are generally specified as worst case parameters. Thus, the seek time is the maximum time required to move the typical movable head assembly of a disk drive from one position to another, normally across the entire radial width of the disk. The balance of the access time is the time required for the disk to make almost a full revolution since worst case analysis requires assuming that the head arrives at the appropriate track just after the first bit position of interest is passed under it and thus must await almost a full revolution of the media before the data of interest passes under the head. In modern disk drive systems, particularly those used in small personal computers, seek time is on the order of tens of milliseconds, while instruction execution speed is normally on the order of a few nanoseconds. Thus, the need to obtain data from a disk drive can be viewed as slowing down operation of the computing device by a factor on the order of a million.

Over the last decade, applications programs for small computers have become more and more complex, and provide for the storage and manipulation of very large amounts of data. In particular, relational database programs for storing large numbers of relatively large records are in common use. Many such applications unavoidably cause the computer running them to perform many disk reads and writes during processing of records of performing tasks that require access to multiple records, such as report generation. In many such applications, the time required for disk accesses determines the speed at which a particular task can be performed, and no increase in CPU performance can significantly improve the overall result.

Typically, a disk drive comprises a set of vertically stacked media disk (also termed platters), a set of read/write heads mounted to actuator arms and a motor for rotating the media disk relative to the read/write heads. The media disks are circular with two horizontal faces that are opposite and parallel to each other. The media disks are rotatably mounted on a spindle connected to the motor such that the media disks rotate in unison. Thus, the set of disks geometrically defines a cylinder with the mounting spindle defining a longitudinal main access of the cylinder and the access of rotation of the individual disks.

The horizontal faces of the media disks are each coated with a magnetically permeable film, which is subdivided into concentric tracks. The tracks are logically divided into a plurality of magnetized bit positions for storing information. Information is stored in the tracks by aligning magnetic fields at the bit positions to particular patterns. Those patterns can later be read to reproduce the information stored.

Bit fields are aligned by magnetic fields generated by the read/write heads. The read/write heads each comprise a core element wrapped by a wire coil. A magnetic field is generated by passing a current through the wire coil. Because the polarity of the field is dependent on the direction of the current flow, the magnetic field may by reversed by alternating the direction of the current through the coil. This ability allows information to be stored by aligning bit fields into one of two possible orientations.

The actuator arms radially move the read/write heads inwardly and outwardly over the media disks. The read/write heads float on a cushion of air generated by the rotation of the media disk. When information is stored to a media disk, a read/write head is moved over the media disk, the desired track in which the information is to be stored is located. Current is then passed through the coil of the read/write head as necessary to generate the magnetic fields that align the bit fields of the track in the desired pattern. Similarity, when information is recalled from the media disk, a read/write head is moved over the media disk to the desired track in which the information is stored and the alignments of the bit fields of the track are read by the induced currents in the head coil.

Due to the amount of information contained in most computer files, more than one track is required to store most files. Thus, most files are stored to various tracks, which may or may not abut each other. To store or retrieve a file, then, the actuator arm must typically move the read/write head back and forth between multiple tracks, accessing one track at a time. In so doing, a relatively large amount of time is lost due to inertia in positioning the read/write head over the different tracks and to accessing only one track at a time.

As noted above, access times for disk drives are the rate limiting step in full execution of many applications that require intensive use of disk storage. Furthermore, more complex applications are sometimes written with program overlays so that they may be run on computers with somewhat limited amounts of addressable random access memory. An overlay is a portion of the executable code of a program that can be written into or out of memory, under the control of the main portion of the program that always stays resident in memory during program execution, in order to accommodate different tasks at different times. Overlays are written into the memory for executable code from a disk file. Therefore, the calling of multiple routines that require overlays to be written into memory is inherently slow, because of the time required to fetch the overlay from the disk drive and read it into system memory.

In summary, the power and speed of general purpose digital computers made today allows very complex tasks to be performed. As the processing speed of the machines increases, the complexity of the tasks asked of them by the authors of application programs have tended to likewise increase. The increase in the complexity of the task in the amount of data to be manipulated has caused a corresponding increase in the number of disk accesses typically required for complex data processing tasks. Since the disk access time is many orders of magnitude slower than typical CPU processing time, typical slow disk drives have acted as something of an anchor on the overall goal of increased throughput of data processing by modern general purpose computers. Thus, there is a need in the art for an economical disk drive system, particularly for a small computer, with greatly reduced access times.

Prior art fixed head magnetic data storage media have been built and proposed. One of the earliest mass storage devices used with computer systems were rotating cylindrical drums coated with magnetizable oxides some of which included an array of fixed heads over the recording surface. Those multi fixed head systems are shown, for example, in U.S. Pat. Nos. 3,090,947 and 3,320,599. No prior art system known to the inventors has provided a practical fixed head arrangement for implementing a high density hard disk drive of the type typically used in small general purpose computers today. No system for the present invention has provided a practical implementation of a fixed head disk drive that is suitable for a high density small track width disk drive with storage capacity and bits per unit area commensurate with that available for modern conventional movable head technologies.

Another development in disk drive technology in recent years has been the increased density of data storage per unit area of the storage media. Closer head to media spacings, more than the availability of more precision stepping motors do control head positioning have lead to significant increases in the amount of data that can be stored on given size rotating medium. Typically, increased density is achieved by smaller track widths which in turn require more precision positioning for the heads during read and write operations.

As track widths and inter tracks facings become smaller, greater attention must be paid to phenomenon such as thermal expansion and contraction of the media disk, similar thermal phenomenon on head carriage mechanisms, and a particular differential co-efficients of expansion between the media disk and the apparatus carrying the movable head assembly. Since the head carriage and moving apparatus is typically made from different materials than the substrate carrying the magnetizable media, they tend to expand and contract with different thermal coefficients thus leading to problems of misalignment as a thermal phenomenon.

The closely spaced tracks of high density disks require the read/write heads to be very accurately positioned over the tracks so that the heads do not incorrectly access information of a wrong but closely spaced track. Thus, there exists a need in the art for an accelerated disk drive with means for accurately maintaining the position of the read/write heads over the tracks of high density disks.

Another problem associated with high density disk drives is that the read/write heads must be mounted in extreme close proximity to the magnetic film. This is because a weaker, more precise magnetic field must be used in accessing a track of a high density disk in order to prevent the bits of adjacent tracks from being affected. A result of such mounting, however, is that normal wear and tear or slight fluctuations during disk access may cause the read/write heads to impact the magnetic film of the media disk (also termed a crash) and by that cause a catastrophic failure of the disk drive. Therefore, there exists a need in the art for an accelerated high density disk drive with means for safely mounting the read/write heads in close proximity to the media disks.

SUMMARY OF THE INVENTION

The present invention meets the above cited needs and provides a disk drive system of comparable or improved density as compared to currently available disk drive technology, with significantly improved access times. In particular, the present invention is an improved species of multiple fixed head disk drives that have a zero seek time. Basically, this is accomplished by providing an array of fixed heads that are etched into a planer surface on a head mount disk. The use of etched heads and a planer surface allows very small head to medium spacing to be employed yet allows for provision of multiple heads closely spaced, radially, in order to provide a high density disk drive.

Generally described, the present invention provides at least one media disk rotatably mounted within a housing. The housing is abutted at each edge by a head mount disk. Each head mount disk comprises an interlaced array of heads etched into the surface of head mount disk that are operatively associated with tracks on the media disk. The housing is greater in thickness than the media disk by a predetermined spacing distance such that the surface mounted heads are retained in spaced apart relation with the media disk.

The disk drive of the present invention comprises a housing formed by one or more supports. The housing includes opposite edges spaced apart to give the housing a predetermined thickness. A media disk for information storage is rotatably mounted in the housing. The media disk includes parallel faces with a plurality of concentric tracks disposed therein. A disk thickness is defined between the parallel faces. The thickness of the housing is a predetermined spacing distance greater than that of the media disk such that structures abutting the edges of the housing are held in spaced apart relation with the thinner media disk therein.

The housing is abutted at each edge by a head mount disk. The head mount disks include a substantially planer surface disposed toward the media disk with a head assembly surface mounted thereon for operative association with an opposing face of the media disk. The surface mounted head assemblies are retained in spaced apart relation with the opposing faces of the media disk by virtue of the predetermined spacing distance. As used in the specification, reference to the heads being surface mounted should be understood to mean that the head assemblies are etched into the substrate of the head mount disk. Thus, physically, the head structure lies in the plane of the surface of the head mount disk. This is not to be confused with references to surface mounted integrated circuit packaging commonly used in modern electronic devices. The spaced apart relation between each head assembly and opposing face is a selected distance, which is determined by the predetermined spacing distance.

The head assembly of each head mount disk comprises a static array of heads. The heads are interlaced over the concentric tracks of the media disk. As a result, a plurality of tracks of the media disk may be accessed simultaneously and without movement of the heads. Thus, disk access is greatly accelerated.

In the preferred form of the present invention, the heads etched into the head mount disk are offset angularly from one another so as to allow for a close packing of the same radially. In other words, the areas of the head disk devoted to etching of radially adjacent heads may overlap radially, but their angular offset prevents them from physically intersecting each other. The disk is logically arranged so that the tracks under such respective adjacent heads will logically begin when the media disk is at a particular orientation with respect to the housing, even though the beginnings of the tracks are angularly offset from each other physically. This arrangement allows the high density fixed heads structure of the present invention which is heretofore unachievable by prior fixed head rotating magnetic media storage devices.

In another aspect of the present invention, the head mount disks and the media disk comprise substrate materials that have the same thermal coefficient of expansion. Thus, the head mount disks and the media disk expand and contract as a unit. As a result, the surface mounted heads of the head mount disks move, expand, and contract with tracks of the media disk in response to temperature variations. Therefore, the surface mounted heads remain accurately positioned over the media disk tracks despite temperature variations.

The preferred material for construction of the media and head mount disk is ceramic substrate material of the type normally used for ten micron thick film integrated circuit fabrication processes. Such material is known to those skilled in the art. In preferred forms the present invention both the read/write heads and the necessary demultiplexing and drive circuitry are etched into the ceramic substrate of the head mount disk used in a ten micron thick film process.

Further, because the heads are etched into the head mount disk and are thus retained in spaced apart relation with the media disk by the predetermined spacing distance of the housing, the heads will not impact the media disk. Therefore, the heads may be mounted in close proximity to the media disks without risk of crashing the disk drive.

In an alternate embodiment of the present invention, the heads extend above or below the surface of the head mount disk to make constant contact with the media disk. Because there is no space between the heads and the media disk, reading and writing performance is maximized. Additionally, the head mount disk may be spaced further from the media disk in this embodiment because the heads extend to the media disk. As a result, this alternate embodiment is preferred for structures for which wind shear between rapidly rotating media disks and closely spaced head mount disks is a concern.

Thus, it is an object of the present invention to provide an improved disk drive.

It is a further object of the present invention to provide an improved disk drive with accelerated disk access.

It is still further an object of the present invention to provide an improved high density disk drive with accelerated disk access and zero seek time.

It is another object of the present invention to provide an improved high density disk drive with means for accurately maintaining the position of the heads over the tracks of the media disks.

It is still another object of the present invention to provide an improved high density disk drive with means for safely mounting the heads in close proximity to the media disks.

It is yet another object of the present invention to provide an improved high density disk drive with means for mounting a plurality of fixed heads in constant contact with the media disks.

It is still a further object of the present invention to provide an improved disk drive assembly of the fixed head type. In particular, it is an object of the present invention to provide the first practical fixed head assembly for a disk drive that allows typical or improved bit per unit area density with respect to conventional technology and further provides accurate and reliable thermal tracking of head assemblies and tracks to a greater degree than that which has been achieved heretofore.

Further objects, features and advantages of the present invention will become apparent upon reviewing the following description of the preferred embodiments of the invention, when taken in conjunction with the drawing.

BRIEF DESCRIPTION OF THE DRAWINGS

FIG. 1 is a cross-sectional view of the disk drive of the preferred embodiment showing the media disks rotatably mounted within the housings in spaced apart relation with the head mount disks.

FIG. 1A is a cut away detail of a portion of FIG. 1 showing maintenance of the spacing distance in the preferred embodiment.

FIG. 2 is a perspective view of the media disk of the preferred embodiment.

FIG. 3 is a perspective view of the housing of the first embodiment.

FIG. 4 is a perspective view of the head mount disk of the preferred embodiment.

FIG. 5 is a bottom plan view of the head mount disk of FIG. 4 showing a surface mounted head assembly.

FIG. 6 is an enlarged fragmentary view of the surface mounted head assembly of FIG. 5 showing the interlacing of the heads and their connection to a demultiplexer in the first embodiment.

FIG. 7 is a simplified schematic diagram of the components of a head for accessing the media disk in the preferred embodiment.

FIG. 8A is a top plan view of the media disk showing the different lengths of two spaced apart tracks.

FIG. 8B is a simplified schematic diagram illustrating the principles of the timing circuitry employed for writing a sector to the media disk illustrated in FIG. 8A.

FIG. 9A is a cut away fragmentary view of the disk drive of an alternate embodiment of the present invention showing maintenance of the spacing distance.

FIG. 9B is an enlarged fragmentary view from the side of FIG. 9A looking radially inward showing the lash head assembly of the alternate embodiment.

DETAILED DESCRIPTION

Referring now in more detail to the drawings, in which like numerals refer to like parts throughout the several views, FIG. 1 shows a disk drive 10 in accordance the present invention. This invention is described with specific reference to a disk drive that electromagnetically stores and accesses information. However, this invention should also be understood as applicable to other types of disk drives that employ a sensor in close proximity with a rotating media disk to access that disk.

As shown in FIG. 1, the disk drive 10 comprises a plurality of vertically stacked media disks 12 in spaced apart relation with one another. Preferably, the disk drive 10 comprises six media disks 12. It will be understood by those skilled in the art, however, that the disk drive 10 may comprise a different number of media disks 12 and still fall within the scope of the present invention.

The media disks 12 are mounted along their spindle 14 which defines a longitudinal axis for a cylinder having the media disks as circular sections thereof. Preferably, the spindle 14 is comprised entirely of aluminum. A mounting collar 16 secures each media disk 12 in fixed relation to the spindle 14. The spindle 14 is, at its top end, as shown in FIG. 1 journaled within a free turning beating 17. The bearing 17 is recessed into a top 26 of the disk drive 10. The bottom end of spindle 14 is connected to a motor mounting collar 19 of a motor 18. The motor 18 is recessed in a bottom plate 28 of the disk drive 10.

Each media disk 12 is concentricity bounded by a spacer ring 20 having a predetermined thickness. Thus, the preferred embodiment of the present invention comprises six spacer rings 20 that each bound an associated media disk 12. The spacer rings 20 are each a predetermined spacing distance greater in thickness than the media disks 12. Thus, structures that abut the spacer rings 20 are held in spaced apart relation with the thinner media disk 12 disposed therein.

FIG. 1A is a detail of FIG. 1 wherein it can be seen that the predetermined spacing distance (SD) is the difference between the thickness of spacer ring 20 and media disk 12. Therefore 0.5 SD, i.e., one half the spacing distance, is the separation between a head mount disk 22 and the surface of media disk 12 upon which the heads write and from which they read.

The spacer rings 20 are separated from one another by abutting head mount disks 22. Thus, the preferred disk drive 10 of the present invention comprises five head mount disk 22 disposed between the six spacer rings 20. Additionally, a head mount disk 22 is disposed above the uppermost spacer ring 20 and below the lowermost spacer ring 20. As is explained in greater detail herein below, each of the head mount disk 22 has a plurality of electromagnetic heads (not shown in FIG. 1) etched therein on each side of the head disk that faces the right surface of one of media disks 12. One of the principal advantages of the present invention lies in the selection of a material for the head mount disk that is an appropriate substrate for fabrication of the necessary semiconductor circuitry for addressing individual heads as well as fabrication of the heads themselves by a ten micron etching process. This provides positioning of the heads spatial on the surfaces of head mount disk 22 and assures that the heads all lie in a single plane on the surface of the head mount disk. By employing this process of fabrication, the head to media spacing is determined by the predetermined spacing distance established by the difference between the thickness of spacer rings 20 and media disks 12. The heads of the head mount disks 22 are retained a selected distance above the media disks 12 by the predetermined spacing distance of the spacer rings 20.

The uppermost head mount disk 22 and the lowermost head mount disk 22 are each separated by a spacer 70 from the top 26 and the bottom 28 of the disk drive 10, respectively. A pair of securing pins 24 connect the head mount disks 22 in fixed relation with the spacer rings 20 and the spacers 70. Together, the spacer rings 20, the head mount disks 22, the spacers 70 along with the top 26 and the bottom 28 of the disk drive 10 operate to seal the disk drive 10 from outside contamination.

Next, various components of the disk drive 10 of the preferred embodiment will be described. As shown by FIG. 2 the media disk 12 is circular in shape with two parallel faces, 32a and 32b. The media disk 12 has a diameter $D_M$, which is 3.907 inches in the preferred embodiment. This diameter is preferred because the resulting disk is not so large that the extremities droop and are in danger of striking a head mount disk 22 but is large enough to provide an ample area for storing information. It will be understood by those skilled in the art, however, that the diameter of the media disk can be varied within the scope of the present invention.

The media disk of the preferred embodiment has a nominal thickness as shown as dimension $T_M$. In the preferred embodiment this is 0.186 inches.

An orifice 34 for mounting the media disk 12 to the spindle 14 is disposed at a center of the media disk 12. The orifice 34 has a diameter of 0.772 inches.

The media disk 12 comprises a ceramic substrate 30 coated at each of the parallel faces 32 with a magnetic film 36. The ceramic substrate 30 may be Aluminum Oxide, or other materials that are non-conductive, have a low thermal coefficient, and have a modulus of elasticity that is typical of media disks.

The magnetic film 36 is ferric in nature and is applied to the ceramic substrate 30 by standard sputter thinfilm deposition methods. The magnetic film 36 is deposited to a standard thickness and provides a medium that can be formatted into a plurality of concentric tracks (not shown) for storing information.

Each of the parallel faces 32 of the media disk comprises 1024 tracks with 144 sectors per track and 1042 kilobytes (Kb) per sector. Thus, each media disk 12 has approximately 307 megabytes (MB) of storage capacity. The preferred disk drive 10 that includes six media disks 12, then, has approximately 1,843 megabytes (MB) of storage capacity.

Information storage on media disk 12 is accomplished in the same way as it is in conventional high density disk drives. The position of each head defines one of a plurality of concentric tracks on the media disk underlying the head. A particular angular position from a predetermined starting point for a track, various bit positions are defined logically by a timing circuitry running in synchronism with the rotation of the media disks. The various tracks are divided angularly into sectors, sectors being the smallest segment of information that can be read or written in a single operation. The bits of the sector are written by exciting the coil of the head associated with the track with a pattern of pulses of alternating polarity using conventional RLL coding to store ones or zeros at desired positions within the bit sequence of the sector.

As shown in FIG. 3, the spacer ring 20 is annular in shape with an outside diameter $D_M$, which is 5.321 inches in the preferred embodiment and an inside diameter $D_{IH}$, which is 4.307 inches. Thus, when a media disk 12 is disposed inside the spacer ring 20, a gap of 0.2 inches exists between the circumferencal edge of the media disk 12 and the inside surface 21 of the spacer ring 20. A pair of openings 40 are disposed at opposite ends of the spacer ring 20 for engagement with the securing pins 24.

Preferably, the spacer ring 20 is of unitary construction comprising polymers, plexiglass, ceramics, non-ferric metals or a combination of these materials. It will be understood by those skilled in the art, however, that the spacer ring 20 may be formed, for example, by a plurality of distinct supports spaced at select intervals around the media disk. It will further be understood by those skilled in the an that a plurality of annulis can be used to form the spacer ring 20, or part of the spacer ring 20.

The spacer ring 20 has opposite edges 38a and 38b and a predetermined housing thickness $T_H$ defined there between. The predetermined housing thickness $T_H$ is between 12 micro-inches (0.000012 inch) and 24 micro-inches (0.000024 inch) greater than the thickness of the media disk 12. In the preferred embodiment, the predetermined housing thickness $T_H$ is 0.18602 inch, which is 20 micro-inches (0.00002 inch) greater than the thickness of the media disk. That difference in thickness is a predetermined spacing distance in the preferred embodiment.

Due to the predetermined spacing distance, the face 32a of the media disk 12 is spaced apart from a plane of the edge 38a of the spacer ring 20 when the media disk 12 is disposed within the spacer ring 20. Similarly, the edge 32b of the media disk is spaced apart from a plane of the second edge 38b of the spacer ring 20.

As shown in FIG. 4, the head mount disk 22 is circular in shape with opposite substantially planer surfaces 35. Because the head mount disks 22 abut the spacer rings 20, the substantially planer surfaces 35 are retained a selected distance above or below the media disks 12. Thus, the substantially planer surfaces 35 cannot impact the media disk 12. The selected distance between each surface 35 and media disk 12 is determined by the predetermined spacing distance. Specifically, the selected distance is half the spacing distance because the media disks 12 are each vertically centered in the spacer rings 20. Thus, in the preferred embodiment, the selected distance between each substantially planer surface 35 and an opposing face 32 of a media disk 12 is 10 micro-inches (0.00001 inch).

The circular shape is preferred because the resulting head mount disk 22 extends across the entire 360 degrees of arc of an opposed media disk 12. Those skilled in the art will understand, however, that the shape of the head mount disk 22 may be varied within the scope of the present invention.

The head mount disk 22 has a diameter $D_{HM}$ and a thickness $T_{HM}$. In the preferred embodiment, the diameter $D_{HM}$ is 5.047 inches and the thickness $T_{HM}$ is 0.063 inches. This diameter is preferred because the outer ends of the resulting disk overlap the spacer ring 20. It will be understood by those skilled in the art, however, that the diameter of the head mount disk can be varied within the scope of the present invention.

An orifice 42 is disposed at a center of the head mount disk 22. The orifice 42 has a diameter of 1.871 inches in the preferred embodiment. A pair of openings 40 are disposed at opposite ends of the head mount disk 22 for engagement with the securing pins 24.

The head mount disk 22 comprises a substrate 44 that can be constructed polymer, plexiglass, ceramic or non-ferric metal, such as aluminum. It is preferred, however, that the substrate of the head mount disk 22 be a ceramic that is the same as that of the media disk 12 because, in such a case, both disks will necessarily have the same thermal coefficient of expansion. Those skilled in the art will understand that the same result can be achieved by constructing the head mount disk 22 and the media disk 12 of different substrate materials that nevertheless have the same, or substantially similar, thermal coefficients of expansion.

Because the head mount disks 22 and the media disks 12 have the same, or a substantially similar, thermal coefficients of expansion, they expand and contract as a unit. As a result, the surface mounted heads 47 of the head mount disks 22 move together with tracks of the media disks 12 in response to temperature variations. Therefore, the heads 47 remain accurately positioned over the tracks of the media disk 12 despite temperature variations.

A head assembly 45 is etched in the ceramic substrate 44 on each surface 35 disposed toward a media disk 12. Thus, the five head mount disks 22 disposed between the six spacer rings 20 (FIG. 1) have head assemblies 45 surface mounted onto both substantially planer surfaces 35. The upper and lowermost head mount disks 22, however, have a head assembly 45 etched into only one of surfaces 35. Because the head assemblies 45 are flush to the surface 35 of head mount disk 22, the head assemblies 45 are retained the selected distance of 0.001 inch from opposing faces 32 of media disks 12.

Each head assembly 45 comprises a plurality of heads 46 and demultiplexer circuits 48. FIG. 6 is a detailed drawing of a portion of head mount disk 22 shown in FIG. 5. As may be appreciated from viewing FIGS. 5 and 6 together, each head assembly includes fourteen one-of-64 demultiplexer chips 48, each which is associated with a radially extending spoke comprising 64 read/write heads. Each of demultiplexers 48 is a one of 64 demultiplexer fabricated using complementary oxide metal semiconductors (CMOS) technology and ten micron thick film techniques. One of 64 demultiplexer chips, the fabrication thereof, is well known to those skilled in the art.

As best shown in FIG. 6 each of the 64 output lines from demultiplexers 48 is connected to one head 46 via one of lines 54. There are 14 spokes and 14 demultiplexers chips on each side of head mount disk 22 for a total of 896 read/write heads.

As illustrated in FIG. 5, it is considered preferable to fabricate the demultiplexers in clusters and route sense lines 54 through separate layers of the substrate of disk 22. However, the radially extending spokes of heads 46 can be distributed angularly around surface 35 of disk 22 in any manner desired. There may be situations in which it will be preferable to dispose demultiplexers chips 48 between spokes of heads 46 for easier interconnection. It is basically a trade off between the routing of metalization layers required to connect the demultiplexer chips to the heads and the number of layers required to connect the inputs to the demultiplexers to an external connection (not shown) to a disk controller.

Because of the high density of the heads in the preferred embodiment and the limitations of photo reproducible patent specification drawings, it may not be clear from the accompanying drawing figures that each of heads 46 is disposed at a different radial distance from the center of disk 22. However, in the preferred embodiment this is the case and each of heads 46 on one of the fourteen spokes of a head assembly 45 is offset so as to be disposed of the unique radial distance from the center of disk 22, thus defining one and only one track on its associated media disk.

While not shown in the drawings, the physical interconnection between a disk drive controller and the head mount disk are accomplished with 16 line ribbon cable. Metallized contacts to precision pin drilled terminals filled with 2K to 8K gold constitute the preferred apparatus for connecting the head mount disk to a conventional disk controller circuit.

FIG. 7 shows a partial detail of a typical read/write head control circuit. Each head has a coil 56 fabricated as a part thereof connected to lines 54 and the emitter of phototransister 68 which forms a part of an optical isolator 64. During a write operation, the source of encoding pulses (not shown) is connected to line 54 and current pulses are passed through coil 58 to write a sector on the associated track. Photo diode 66 is controlled by six input NAND gate 62 which thus decodes the particular one head of the 64 on each spoke for reading or writing.

During read operations a sense amplifier is connected between terminals 54 and 54' and the data constituting a sector of the associated track is read from the media disk in a conventional manner. In operation, the motor 18 rotates the spindle 14 and thus the media disk 12 at 3600 to 7400 revolutions per minute (RPM). Thus, the media disks 12 complete a rotation every milliseconds. Turning next to FIGS. 8A and 8B, an additional inventive aspect of the preferred embodiment is illustrated. In principle, this aspect of the present invention could be applied to more conventional disk drives. However, there are physical aspects of embodiments of the present invention that make it a particularly suitable environment for a variable pulse with clocking arrangement as is used in the preferred embodiment.

FIG. 8A illustrates the physical principle involved. As is always the case with rotating media with spiral information tracks or radially disposed information tracks, the linear speed of the media under the transducer increases as the distance from the center of the rotating media increases. Therefore, considering fundamental principles, more information can be stored on outer tracks than on inner tracks for a specified angular segment of the media since a greater linear distance is available.

As most rotating media, conventional disk drives have employed the expedient of a constant bits per unit angle for storage, irrespective of the radial location of the tracks in which information is stored. In order to take full advantage of the capability of the media, the preferred embodiment of the present invention employs an arrangement in which the information storing portion of the surface of media disk 12 is divided into a plurality of areas defined by radial distance from the center of the disk. The goal is to maintain the number of information bits per unit arc length of the tracks at nominally a constant.

Turning to FIG. 8A, line 71 shows the innermost track on the disk at $r_1$. Radial line 72 shows a track 75 at radius $r_2$ from the center, $r_2$ being twice of the length of $r_1$. For tracks line at this radial distances between $r_1$ and $r_2$, the basic bit clocking rate is employed and thus the minimum arc length per bit allocation is determined by the basic bit rate, the rotational speed of the disk, and the distance $r_1$. For tracks lying on or outside radius $r_2$, the bit clock speed is double. Therefore, twice as much information per physical track is packed onto the outer tracks of the disk. From the relationship of $r_1$, $r_2$, it will be apparent that the arc length per bit is the same for the tracks lined at the respective radii.

The preferred embodiment thus defines multiple logical tracks lying in the same physical track for conventional decoding techniques in which a constant number of sectors per track, with the sectors having a constant number of bits, are employed in the addressing scheme for the disk drive.

FIG. 8B illustrates in principle the timing circuitry employed for writing a sector to the media disk illustrated in FIG. 8A. Line 80 carries a bit clocking signal at twice the basic bit rate, the basic bit rate being that employed for the inner tracks of the disk. This signal is provided to one input 81 of a multiplexer 82. The signal on line 80 is also provided as an input to a divide by two flip flop 85, the output of which appears on line 86 connected to a second input 87 of multiplexer 82. An INNER/OUTER control line 88 is connected to a select input 89 of multiplexer 82 to control whether the signal at input 81 on the signal at input 87 is provided as an output on line 90 to a shift input 91 of a sector buffer 92 into which data to be written to a sector has been placed. The source of data is line 95 shown as coming from a disk controller (not illustrated). The output of the sector buffer is shifted out on line 96 under the control of the signal at shift input 91 in a conventional manner.

The signal on line 88 is generated by simply decoding high order address bits for the tracks, i.e., from the head demultiplexers. Therefore, when the outer tracks are selected, the B input 81 is connected to shift input 91 of buffer 92 so that the data pulse width is of half the duration that they are when data is written to the inner tracks. However, the arc length of travel along the surface of media disk 12 stays substantially the same since an outer track is twice the distance from a corresponding inner track.

It should be understood that while this aspect of the present invention is illustrated with the media disk divided into two segments with a two to one ratio of pulse widths, that other subdivisions of the disks and other relationships pulse widths may be employed so long as the pulse width is shortened as the radial distance from the center of the media disk 12 increases.

The foregoing description of the preferred embodiment provides the advantages described and fulfills the above-described needs. However, those skilled in the art will appreciate that the rapidly rotating, closely spaced, large surface areas of the media disks and head mount disks will create significant forces from the phenomenon of wind shear on both the disks and the bearings of the preferred embodiment. While it is believed the same are not necessarily debilitating, it may be more economical to manufacture a design subject to less wind shear. This consideration has lead to the invention of the alternate embodiment described herein and shown in FIGS. 9A and 9B. In this embodiment, head to media disk spacing is reduced to zero by providing a plurality of small closely spaced lash heads that extend above or below (depending on the relative orientation of the disks) the head mount disk to contact the media disk. Since the total contact area between the lash heads and the media disks is a small fraction of the total area of the head mount disk, the wind shear is significantly reduced in this embodiment.

In the alternate embodiment of the present invention, shown by FIGS. 9A and 9B, a head mount disk 22' comprises a plurality of lash heads 46' that extend to make contact with a media disk 12'. The media disk 12' of this embodiment is the same as the media disk 12 of the first embodiment except that it is preferably 3.0 inches in diameter. The head mound disk 22' and a spacer ring 20' are proportionally sized to accommodate the smaller media disk 12'.

The lash heads 46' are radially disposed on the head mount disk 22' such that each head 46' is a unique radial distance from the center of the disk 22' and defines one and only one track on its associated media disk. In the preferred embodiment, the head mount disk 22' has 1024 lash heads 46' per side. Thus, the head mount disk 22' configures 1024 tracks per side of an associated media disk 12'. Each track includes 144 sectors with 1042 Kb per sector. As a result, each media disk 12' has approximately 307 MB of storage capacity, which is the same as that of the larger media disk 12 in the first embodiment. The same storage capacity is achieved on the smaller media disk 12' by spacing the tracks closer together, which is possible in this embodiment due to the lack of space between the lash heads 46' and the media disk 12'.

Because the lash heads 46' extend to make contact with the media disk 12', the head mount disk 22' may be spaced further from the media disk 12' than in the first embodiment. As a result, this embodiment is preferred for many applications in which wind shear between rapidly rotating media disks and closely spaced head mount disks is a concern.

FIG. 9A is a cut away fragmentary view of a disk drive of this embodiment, in which the distances are greatly exaggerated such that it can be seen that the predetermined spacing distance (SD') is the difference between the thickness of spacer ring 20' and media disk 12'. Therefore 0.5 SD', i.e., one half the spacing distance, is the separation between a head mount disk 22' and the surface of media disk 12' upon which the heads write and from which they read.

The separation between the head mount disk 22' and the media disk 12' is between 0.010 and 0.014 inches. Thus, the spacer ring 20' is between 0.020 and 0.028 inches greater in thickness than the media disk 12'. In the preferred embodiment, the separation between the head mount disk 22' and the media disk 12' is 0.012 inches. As a result, the predetermined housing thickness is 0.024 inches greater in thickness than the media disk 12', which is 0.186 inches thick, for a total thickness of 0.210 inches in the preferred embodiment.

As shown best by FIG. 9B, in which the distances are greatly exaggerated in order that the details may be clearly represented, each lash head 46' comprises a cylinder 102 extending from the head mount disk 22'. The cylinder extends from the head mount disk 22' at an angle $\phi$ from a perpendicular in the direction of travel of the media disk 12'. The angle of $\phi$ is preferably between 10 and 30 degrees. The cylinder 102 can be made of ferric metals, stainless steel, polymer with ferric pregnation, or other materials that produces a magnetic field by induction.

The cylinder 102 extends a length of $L_E$ from the head mount disk 22'. The length $L_E$ is sufficient to produce a slight flex in the cylinder 102 when abutted against the surface of the media disk 12'. That flex biases the cylinder 102 toward the media disk 12' to ensure constant contact between the cylinder 102 and the media disk 12'. Thus, the cylinder 102 should be made of materials that have a flexible nature.

In the preferred embodiment, the cylinder 102 is plug gauge wire that is 0.001±0.0005 inches in diameter and 0.045 inches in total length. The cylinder 102 wire is preferably made of a standard boron/neodium mix that is typical in standard read/write heads. Of that length, the wire extends 0.015 inches, i.e. $L_E$, from the head mount disk 22' at an angle, i.e. $\phi$, of 20 degrees. Thus, for a separation of 0.012 inches between the head mound disk 22' and the media disk 12', the wire is 0.0012 inches longer than necessary to make contact with the media disk 12', which creates a slight flex in the wire.

The cylinder 102 is wrapped by a pair of interwraped coils 104 wired in opposing polarity. In the preferred embodiment, the coils 104 are made of 88 gauge copper wire with a standard polymer installation coating. The lash head 46' is connected to a read/write head control circuit and, from there, to a demultiplexer as described above for the first embodiment. The remaining feature of this embodiment are the same as those for the first embodiment.

From the foregoing description of the preferred embodiments and the several alternatives, other alternative constructions of the present invention may suggest themselves to those skilled in the art. Therefore, the scope of the present invention is to be limited only by the claims below and equivalents thereof.

I claim:

1. A disk drive for storing and retrieving data comprising:
   (a) a spacer ring for enclosing a media disk, said spacer ring having opposite edges and a predetermined spacer ring thickness defined there between;
   (b) said media disk rotatably mounted in said spacer ring, said media disk having opposite faces and a disk thickness defined there between, said media disk having a plurality of concentric tracks said spacer ring thickness being greater than said disk thickness by a predetermined spacing distance;
   (c) a head mount disk abutting each of said opposite edges of said spacer ring, said head mount disks comprising at least one substantially planer surface disposed toward said media disk, said substantially planer surface being a selected distance above an opposing face of said media disk, and wherein said selected distance is determined by said spacing distance;
   (d) a head assembly surface mounted on said substantially planer surface for operative association with an opposing face of said media disk, said head assembly comprising a static array of heads interlaced over said plurality of concentric tracks of said media disk; and
   (e) means for rotating said media disk between said head mount disks.

2. The disk drive for storing and retrieving data as recited in claim 1 wherein said head assembly further comprises a demultiplexer electrically connected to said heads for simultaneously transferring signals.

3. The disk drive for storing and retrieving data as recited in claim 1 wherein said spacer ring is annular in shape and is concentric with said media disk.

4. The disk drive for storing and retrieving data as recited in claim 1 wherein said head assembly is etched into said substantially planer surface.

5. The disk drive for storing and retrieving data as recited in claim 4 wherein said substantially planer surface comprises a ceramic substrate.

6. The disk drive for storing and retrieving data as recited in claim 5 wherein said ceramic is Aluminum Oxide.

7. The disk drive for storing and retrieving data as recited in claim 5 wherein said media disk comprises a substrate having a substantially similar thermal coefficient of expansion as said ceramic substrate.

8. The disk drive for storing and retrieving data as recited in claim 5 wherein said media disk comprises of a substrate having a same thermal coefficient of expansion as said ceramic substrate.

9. The disk drive for storing and retrieving data as recited in claim 4 wherein said substantially planer surface and said media disk comprise ceramic substrates having the same thermal coefficients of expansion.

10. The disk drive for storing and retrieving data as recited in claim 1 wherein said selected distance between said substantially planer surface and said media disk is less than 12 micro-inches.

11. The disk drive for storing and retrieving data as recited in claim 1 wherein said selected distance between said substantially planer surface and said media disk is between 6 and 12 micro-inches.

12. The disk drive for storing and retrieving data as recited in claim 1 wherein said selected distance between said substantially planer surface and said media disk is 10 micro-inches.

13. The disk drive for storing and retrieving data as recited in claim 1 wherein said static array of heads interlaced over said concentric tracks of said media disk comprises a read/write head disposed over each concentric track.

14. The disk drive for storing and retrieving data as recited in claim 1 wherein said static array of heads interlaced over said concentric tracks of said media disk comprises a head group disposed over each concentric track, said head group comprising a read head and a write head.

15. The disk drive for storing and retrieving data as recited in claim 14 wherein said write head of said head group is positioned in front of said read head in regard to the rotation of the media disk.

16. The disk drive for storing and retrieving data as recited in claim 15 wherein said write head of said head group is positioned a quarter-turn in front of said read head in regard to the rotation of the media disk.

17. A disk drive for storing and retrieving data comprising:
(a) a spacer ring for enclosing a media disk, said spacer ring having opposite edges and a predetermined spacer ring thickness defined there between;
(b) said media disk comprising a select substrate material, said media disk rotatably mounted in said spacer ring, said media disk having opposite faces and a disk thickness defined there between, said media disk having a plurality of concentric tracks, said spacer ring thickness being greater than said disk thickness by a predetermined spacing distance;
(c) a head mount disk disposed over said media disk, said head mount disk comprising at least one substantially planer surface disposed toward said media disk, and wherein said head mount disk comprises a substrate having a substantially similar thermal coefficient of expansion as said select substrate material;
(d) a substantially planer head assembly surface mounted on said substantially planer surface for operative association with said media disk, said head assembly comprising a static array of heads interlaced over said plurality of concentric tracks of said media disk; and
(e) means for rotating said media disk relative to said head mount disk.

18. The disk drive for storing and retrieving data as recited in claim 17 wherein said head mount disk comprises a substrate having a same thermal coefficient of expansion as said select substrate material.

19. The disk drive for storing and retrieving data as recited in claim 17 wherein said head mount disk comprises said select substrate material such that said media disk and said head mount disk have the same thermal coefficients of expansion.

20. The disk drive for storing and retrieving data as recited in claim 17 wherein said head assembly is etched into said substantially planer surface.

21. The disk drive for storing and retrieving data as recited in claim 17 wherein said select substrate material is a ceramic.

22. The disk drive for storing and retrieving data as recited in claim 21 wherein said ceramic is Aluminum Oxide.

23. The disk drive for storing and retrieving data as recited in claim 17 wherein said spacer ring is annular in shape and is concentric with said media disk.

24. A disk drive for storing and retrieving data comprising:
(a) a spacer ring for enclosing a media disk, said spacer ring having opposite edges and a predetermined spacer ring thickness defined there between;
(b) said media disk rotatably mounted in said spacer ring, said media disk having opposite faces and a disk thickness defined there between, said media disk having a plurality of concentric tracks, said spacer ring thickness being greater than said disk thickness by a predetermined spacing distance;
(c) a head mount disk abutting each of said opposite edges of said spacer ring, said head mount disks comprising at least one substantially planer surface disposed toward said media disk, said substantially planer surface being a selected distance above an opposing face of said media disk, and wherein said selected distance is determined by said spacing distance;
(d) a plurality of heads mounted to said substantially planer surface and interlaced over said plurality of concentric tracks of said media disk, said plurality of heads extended to be in contact with an opposing face of said media disk; and
(e) means for rotating said media disk between said head mount disks.

25. The disk drive for storing and retrieving data as recited in claim 24 wherein said heads comprise:
(a) a cylinder mounted to said substantially planer surface and extended to be in contact with an opposing face of said media disk;
(b) a pair of coils wrapped around said cylinder; and
(c) a control circuit for inducing a magnetic field around said cylinder with said coils and for perceiving magnetic fields in proximity with said cylinder.

26. The disk drive for storing and retrieving data as recited in claim 24 wherein said spacer ring is annular in shape and is concentric with said media disk.

27. The disk drive for storing and retrieving data as recited in claim 24 wherein said substantially planer surface is comprises a ceramic substrate.

28. The disk drive for storing and retrieving data as recited in claim 27 wherein said ceramic is Aluminum Oxide.

29. The disk drive for storing and retrieving data as recited in claim 27 wherein said media disk comprises a substrate having a substantially similar thermal coefficient of expansion as said ceramic substrate.

30. The disk drive for storing and retrieving data as recited in claim 27 wherein said media disk comprises a substrate having a same thermal coefficient of expansion as said ceramic substrate.

31. The disk drive for storing and retrieving data as recited in claim 24 wherein said selected distance between said substantially planer surface and said media disk is between 0.010 and 0.014 inches.

32. The disk drive for storing and retrieving data as recited in claim 24 wherein said selected distance between said substantially planer surface and said media disk is 0.012 inches.

33. The disk drive for storing and retrieving data as recited in claim 24 wherein a read/write head is disposed over each concentric track of said media disk.

34. The disk drive for storing and retrieving data as recited in claim 24 wherein a head group is disposed over each concentric track of said media disk, said head group comprising a read head and a write head.

35. The disk drive for storing and retrieving data as recited in claim 34 wherein said write head of said head group is positioned in front of said read head in regard to the rotation of the media disk.

36. The disk drive for storing and retrieving data as recited in claim 35 wherein said write head of said head group is positioned a quarter-turn in front of said read head in regard to the rotation of the media disk.

* * * * *